US008583818B2

(12) United States Patent
Dhruv et al.

(10) Patent No.: US 8,583,818 B2
(45) Date of Patent: Nov. 12, 2013

(54) SYSTEM AND METHOD FOR CUSTOM SEGMENTATION FOR STREAMING VIDEO

(75) Inventors: Jignesh Yashwant Dhruv, Monmouth Junction, NJ (US); Shalitha Arosha Senanayake, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 125 days.

(21) Appl. No.: 13/018,315

(22) Filed: Jan. 31, 2011

(65) Prior Publication Data

US 2012/0198089 A1      Aug. 2, 2012

(51) Int. Cl.
   *G06F 15/16* (2006.01)
(52) U.S. Cl.
   USPC ........................................... 709/231
(58) Field of Classification Search
   USPC .................... 709/231, 232, 230, 203, 223
   See application file for complete search history.

(56) References Cited

U.S. PATENT DOCUMENTS

| | | | |
|---|---|---|---|
| 7,287,180 B1 * | 10/2007 | Chen et al. | 714/4.3 |
| 2002/0107968 A1 * | 8/2002 | Horn et al. | 709/230 |
| 2005/0198531 A1 | 9/2005 | Kaniz et al. | |
| 2010/0034257 A1 * | 2/2010 | Sedeffow | 375/240.01 |
| 2011/0211070 A1 * | 9/2011 | Shu et al. | 348/143 |
| 2011/0307929 A1 * | 12/2011 | Youssefmir et al. | 725/89 |
| 2012/0047542 A1 * | 2/2012 | Lewis et al. | 725/97 |
| 2012/0185448 A1 * | 7/2012 | Mensch et al. | 707/693 |

FOREIGN PATENT DOCUMENTS

| | | |
|---|---|---|
| WO | WO 2008/005792 A2 | 1/2008 |
| WO | WO 2010/078281 A2 | 7/2010 |

OTHER PUBLICATIONS

"HTTP Live Streaming," Pantos, R. et al., (Eds.), Apple Inc., Mar. 31, 2011, 24 pages, [Online] [Retrieved on Jul. 23, 2012] Retrieved from the Internet<URL:http://tools.ietf.org/html/draft-pantos-http-live-streaming-06>.

"HTTP Live Streaming Overview: HTTP Streaming Architecture," Apple Inc., 2010, Last updated Apr. 1, 2011, 5 pages, [Online] [Retrieved on Jul. 23, 2012] Retrieved from the Internet<URL:http://developer.apple.com/library/ios/#documentation/networkinginternet/conceptual/streamingmediaguide/HTTPStreamingArchitecture/HTTPStreamingArchitecture.html>.

"HTTP Live Streaming Protocol Specification: HTTP Live Streaming," Apple Inc., 2009, Last updated Mar. 15, 2009, 10 pages, [Online] [Retrieved on Jul. 23, 2012] Retrieved from the Internet<URL:http://developer.apple.com/library/ios/#documentation/NetworkingInternet/Conceptual/HTTPLiveStreaming/_index.html>.

(Continued)

*Primary Examiner* — Benjamin R Bruckart
*Assistant Examiner* — Normin Abedin
(74) *Attorney, Agent, or Firm* — Fenwick & West LLP

(57) ABSTRACT

Disclosed herein are systems, methods, and non-transitory computer-readable storage media for segmenting video. A system configured to practice the method determines a total duration of a video asset. The system identifies an optimal streaming chunk duration and a minimum streaming chunk duration. Then the system segments the video asset into a set of chunks, wherein at least one of a final chunk and a penultimate chunk is less than the optimal streaming chunk duration and greater than the minimum streaming chunk duration, and wherein each remaining chunk is of the optimal streaming chunk duration. The system can segment the video asset based on keyframes or codecs. The system can optionally compile a video manifest file, such as an m3u8 file, containing pointers to each chunk in the set of chunks. Then the system can optionally stream the video asset to a video playback device based on the video manifest file.

18 Claims, 6 Drawing Sheets

(56) References Cited

OTHER PUBLICATIONS

"Technical Note TN2224: Best Practices for Creating and Deploying HTTP Live Streaming Media for the iPhone and iPad," Apple Inc., 2010, Last updated Aug. 3, 2011, 9 pages, [Online] [Retrieved on Jul. 23, 2012] Retrieved from the Internet<URL:http://developerapple.com/library/ios/#technotes/tn2224/_index.html>.

"FFmpeg Documentation," FFmpeg.org, 1 page, [Online] [Retrieved on Mar. 14, 2012] Retrieved from the Internet<URL:http://www.ffmpeg.org/documentation.html>.

"MPlayer Documentation," The MPlayer Project, 2000-2011, 1 page, [Online].
[Retrieved on Mar. 14, 2012] Retrieved from the Internet<URL:http://www.mplayerhq.hu/design7/documentation.html>.

"Linux Encoding," 8 pages, [Online] [Retrieved on Mar. 14, 2012] Retrieved from the Internet<URL:http://sites.google.com/site/linuxencoding/x264-ffmpeg-mapping>.

PCT International Search Report and Written Opinion, PCT Application No. PCT/US2012/023202, Jun. 6, 2012, 9 pages.

* cited by examiner

SYSTEM AND METHOD FOR CUSTOM SEGMENTATION FOR STREAMING VIDEO

BACKGROUND

1. Technical Field

The present disclosure relates to media distribution and more specifically to appropriate segmenting of media for streaming.

2. Introduction

Media distribution, including video distribution, via the Internet is a source of many problems for many reasons, including video encoding formats, bandwidth, playback device capabilities, different screen sizes and resolutions, and so forth. Some device manufacturers provide a set of guidelines for media distributors as a standard or generally accepted way to stream media to that manufacturer's devices, such as a standard chunk size for streaming media. Apple, as an example, has established a 10 second chunk size for streaming video to iPad devices, taking in to account the memory capabilities, bandwidth, and other limitations of the iPad. This chunk size is sufficient to play a current chunk while fetching the next chunk in the background for uninterrupted playback. The final chunk has a size of the remaining time of the video, which is not a problem for single video asset playback, but causes playback problems for multiple asset playback, especially at video boundaries. At a video boundary, the final chunk of a first video segment can be too small (depending on the remaining time for the first video segment after breaking it into 10 second chunks) to allow the device to finish fetching the first chunk of a next video segment. This causes stuttering, pausing, and/or other undesirable video playback effects for the end user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for segmenting video. The method includes determining a total duration of a video asset, identifying an optimal streaming chunk duration, identifying a minimum streaming chunk duration, and segmenting the video asset into a set of chunks, wherein at least one of a final chunk and a penultimate chunk is less than the optimal streaming chunk duration and greater than the minimum streaming chunk duration, and wherein each remaining chunk is of the optimal streaming chunk duration. The method can include compiling a video manifest file containing pointers to each chunk in the set of chunks. The video manifest file can be an m3u8 file. The video asset can be a portion of a larger video asset, such as a chapter or title. The video asset can be segmented based on keyframes in the video asset and/or a codec of the video asset.

Also disclosed are systems, methods, and non-transitory computer-readable storage media for streaming a video asset to a video playback device. The method includes retrieving a video manifest file describing chunks of the video asset. The video manifest file can be generated by determining a total duration of the video asset, an optimal streaming chunk duration, and a minimum streaming chunk duration, and segmenting the video asset into a set of chunks, wherein at least one of a final chunk and a penultimate chunk is less than the optimal streaming chunk duration and greater than the minimum streaming chunk duration, and wherein each remaining chunk is of the optimal streaming chunk duration. Then the method includes generating the video manifest file based on the set of chunks, and transmitting the video manifest file to the video playback device. The method can also include streaming the video asset to the video playback device chunk by chunk based on a request received from the video playback device.

Also disclosed are systems, methods, and non-transitory computer-readable storage media for generating a video manifest file for streaming a video asset. The method includes determining a total duration of the video asset, and identifying an optimal streaming chunk duration and a minimum streaming chunk duration. Then the method includes segmenting the video asset into a set of chunks, wherein a first portion of the chunks is less than the optimal streaming chunk duration and greater than the minimum streaming chunk duration, and a second portion of the chunks is of the optimal streaming chunk duration. The method includes generating the video manifest file based on the set of chunks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for streaming video. A brief introductory description of a basic general purpose system or computing device in FIG. 1A which can be employed to practice the concepts is disclosed herein. FIG. 1B illustrates an exemplary media streaming system architecture. A more detailed description of exemplary algorithms, examples of segmentation, and method embodiments will then follow. Variations shall be discussed herein as the various embodiments are set forth. The disclosure now turns to FIG. 1A.

Figure 1A:
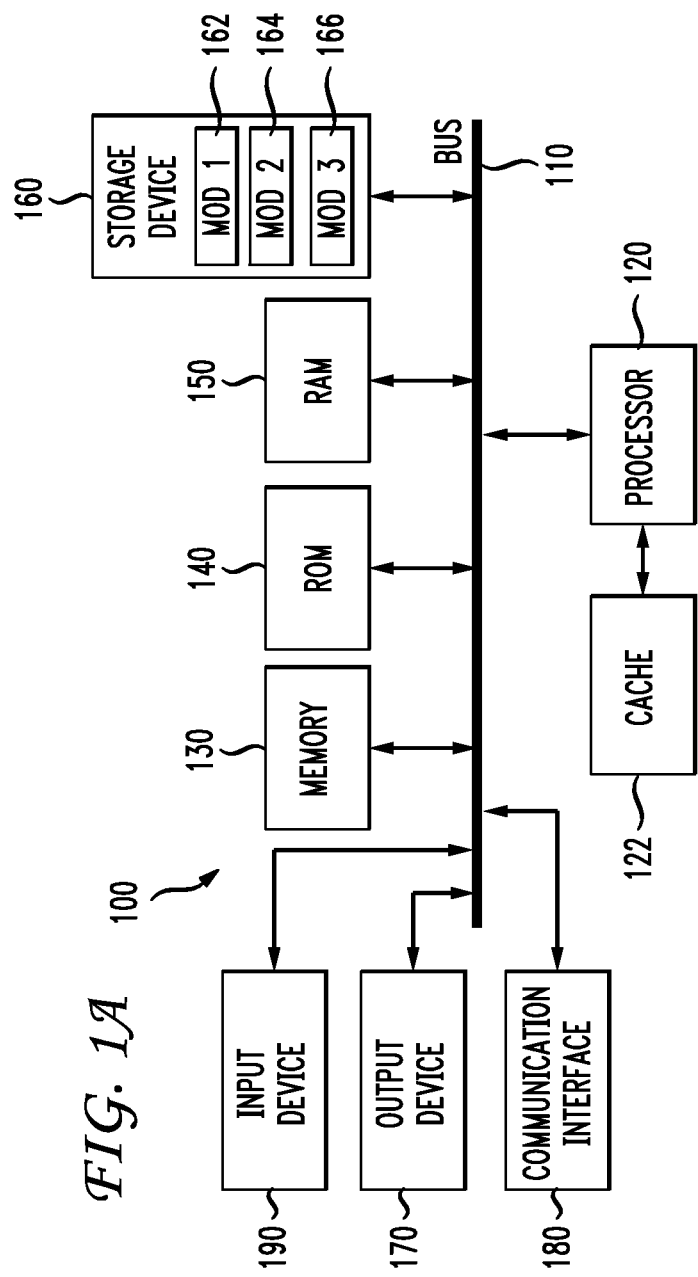
FIG. 1A illustrates an example system embodiment.
Figure 1B:
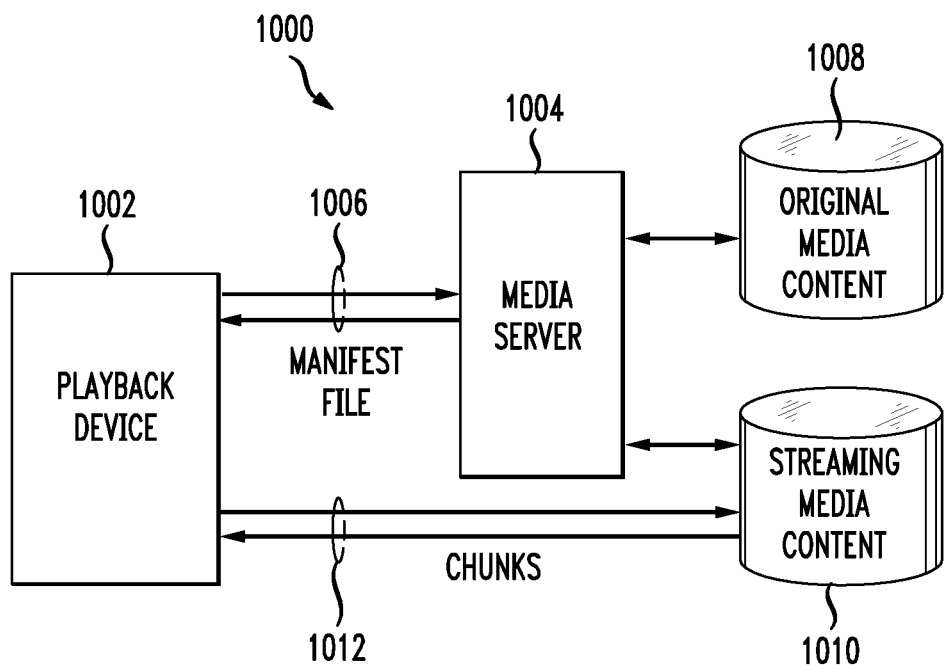
FIG. 1B illustrates an example media streaming system embodiment.

With reference to FIG. 1A, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1A may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to FIG. 1B, which illustrates an example media streaming system embodiment 1000. The communications between the entities depicted in FIG. 1B can occur via one or more wired or wireless networks. Further, the devices can communicate directly, via the World Wide Web, or via an application programming interface (API). A playback device 1002, such as a tablet device, smartphone, desktop or portable computer, set-top box, Internet-enabled television, media center PC, or any other suitable device, first makes a request to a media server 1004 for playback of media content, such as an episode of Star Trek. Typically the media server 1004 resides in a network such as the Internet, but can reside entirely or partially in any of the playback device or a local network for example. The media server 1004 receives the request and generates or fetches a manifest file 1006 to send to the playback device 1002 in response to the request. One example format for the manifest file 1006 is the m3u8 format. The manifest file 1006 includes a list of pointers to sequential chunks of the requested media content. The contents of an example m3u8 manifest file for a 32 second video asset is provided below:

```
#EXTM3U
#EXT-X-MEDIA-SEQUENCE:0
#EXT-X-TARGETDURATION:10
#EXTINF:10,
http://streaming.exampleurl.com/chunk1.ts
#EXTINF:10,
http://streaming.exampleurl.com/chunk2.ts
#EXTINF:6,
http://streaming.exampleurl.com/chunk3.ts
#EXTINF:6,
http://streaming.exampleurl.com/chunk4.ts
#EXT-X-ENDLIST
```

Custom segmentation allows for different segment lengths. In one aspect, an algorithm ensures that the segment size is within a certain threshold, such as chunks must be greater than five seconds unless the overall video length is five seconds or less. The selection and/or adaptation of the algorithm can depend on the playback device, network conditions, the media type, media duration, and/or other factors.

Before or at the time of the request, the media server 1004 generates or identifies the chunks of the requested media content as streaming media content 1010. The chunks of the streaming media content 1010 are generated, either by the media server 1004, the content producer, or some other entity, by splitting the original media content 1008. Upon receiving the manifest file 1006, the playback device 1002 can fetch a first chunk for playback from the streaming media content 1010, and, during playback of that chunk, fetch a next chunk for playback after the first chunk, and so on until the end of the media content. The functionality of the entities depicted in FIG. 1B can be split or merged across entities. For example, an first ingestion server can ingest the original media content 1008 to produce the streaming media content 1010, while a second customer-facing server can service requests for manifest files, and a third media streaming server streams the actual chunks indicated by the links in the manifest file.

Having set forth the general architecture of streaming media, the disclosure turns to a discussion of segmenting video for streaming, including some specific examples. As set forth above, one exemplary approach to segmenting video content is to divide the video content into 10 second chunks and whatever is left over at the end of the video content is the final chunk. In a single video asset scenario, a short final chunk is acceptable because the playback device does not need to fetch another chunk. However, in a scenario where a video manifest file is a composite of multiple smaller video assets, for example, a short "final" chunk for one of the video assets causes a hiccup, freeze, stutter, or other undesirable video playback effect when transitioning to the next smaller video asset.

Figure 2:
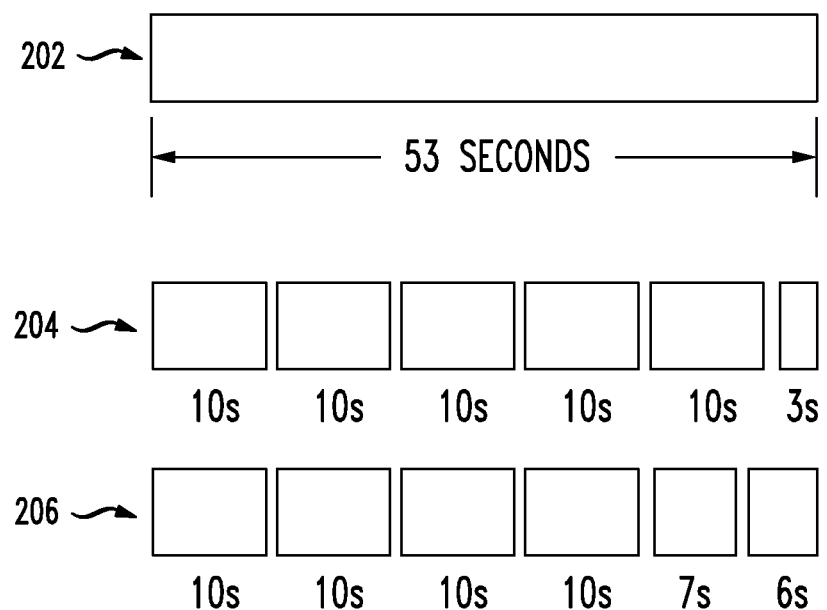
FIG. 2 illustrates splitting a media file into chunks.

FIG. 2 illustrates splitting a media file 202 into chunks. For purposes of illustration, and not by way of limitation, the examples herein are discussed in terms of a maximum chunk size of 10 seconds and key frames occur every 1 second. The same principles can be applied in situations with other chunk sizes and key frame frequencies. The exemplary media file 202 is 53 seconds long. Using a traditional approach, the media file 202 is divided into a first set of chunks 204. The first set of chunks includes five 10 second chunks and a final 3 second chunk.

An alternative approach can generate a second set of chunks 206 including four 10 second chunks, a penultimate 7 second chunk, and a final 6 second chunk. In this approach, the penultimate and final chunks are each less than the preferred chunk size of 10 seconds, but still provide sufficient time for the playback device to fetch a next chunk.

The disclosure now turns to an exemplary algorithm for segmenting video content under the alternative approach. The algorithm can be implemented as a segmenter tool and can use libraries such as FFmpeg. Other algorithms can, for example, be based on a best fit approach. The exemplary algorithm takes several pieces of information as inputs. A first example input is a video file, such as an MPEG-TS file, MP4 file, an Ogg Theora file, or other suitable video file. A second example input is a segment duration. The duration can be specified in seconds or any other time interval. A third example input is an output video file prefix. A fourth example input is an output manifest file such an m3u8 index file. A fifth example input is an http prefix. An optional sixth example input is a variable segment_sequence_number, where the chapters are comma separated in seconds. An optional sixth example input is print_headers. An optional seventh example input is a variable segment window size. The segmenter can take these inputs in any combination, permutation, subset, and order. The segmenter can also accept inputs other than the exemplary inputs described herein. An example command-line interface call to the segmenter tool is provided below:

```
segmenter "video.ts" "100" "10" "video_bitrate" "video.m3u8" "http://streaming.exampleurl.com" 1 21,42,65
```

The exemplary segmenter tool implements the algorithm by performing the following steps. First, the segmenter checks the provided arguments. If the arguments provide the chapter times in seconds, then the segmenter optionally creates an array of breakpoints for ad insertions. The segmenter checks the sequence number argument to name the first ts segment. If sequence number is not provided, then the segmenter starts the first segment at '0'. The segmenter performs a basic check for the source video like video/audio frames, keyframes, codec check, and so on.

Then the segmenter can iterate over each frame of the source video. The segmenter copies the video frame by frame into a buffer. At every keyframe, the segmenter checks to see if the length of the ts segment is equal or greater than segment_duration or the next breakpoint. If not, then the segmenter continues reading and copying video in a buffer. If the video is greater than or equal to segment duration or breakpoint, the segmenter creates a ts segment with the sequence number and updates the manifest file.

The segmenter then checks the next breakpoint. If the next breakpoint is less than 2 (segment_duration), then the segmenter readjusts the segment_duration for the next segment. For example, if segment_duration is 10 seconds and breakpoint is after 15 seconds, the segmenter can adjust the segment duration of next segment to 7 seconds and of the following segment to 8 seconds. After the breakpoint, the segmenter resets the segment duration to the original segment_duration that the user passed to the segmenter as an argument and/or to a default segment_duration value. In order to keep each segment to 10 (user-defined) seconds, the segmenter can round the segment_time of the scanned ts video segment to the nearest integer and compare for breakpoint, thereby guaranteeing that each video segment is 10 (user-defined segment_duration) seconds. This works on an assumption that the video content includes a keyframe at every second. The algorithm and overall approach can be re-adjusted accordingly if the video content includes keyframes at every n seconds.

When the segmenter updates the manifest file, the segmenter checks to see if a header needs to be created in the manifest file. The segmenter can optionally create manifest files with different sequence number for split files which can be stitched together later on with the header. The segmenter can also ensure that each segment is at least 4 seconds in length or some other configurable value. Based on factors such as bandwidth constraints, latency, playback device capabilities, server load, and so forth, the system can generate sets of chunks with a minimum desired chunk size, established automatically and/or manually. The minimum desired chunk size can influence the user experience and the smoothness of the video by ensuring that enough time is allocated to fetch a next chunk. Based on the minimum desired chunk size, the system can "spread" the smaller sizes over more than just the final two chunks. For example, if the minimum desired chunk size is 7 seconds, then a possible third set of chunks for the 53 second media file 202 is three 10 second chunks, a 9 second chunk, a 7 second chunk, and a 7 second chunk. Similarly, if the minimum desired chunk size is 8 seconds, then a possible fourth set of chunks for the 53 second media file 202 is two 10 second chunks, a 9 second chunk, and three 8 second chunks.

If advertisements are to be inserted into the video content, the segmenter can insert a '#AD' marker as desired or indicated in the video content.

The system can perform an analysis of the video content to determine portions of the video content that compress more efficiently and require fewer bytes. Some examples of such portions include video portions with little or no motion, with large regions of a similar texture or color, or other characteristics that a particular video encoder can compress efficiently. The system can automatically place smaller chunks of video, if any, immediately preceding those portions of the video content instead of at the end because the playback device requires less time to fetch those portions. This approach can mitigate possible network bandwidth or latency problems in streaming video.

Figure 3:
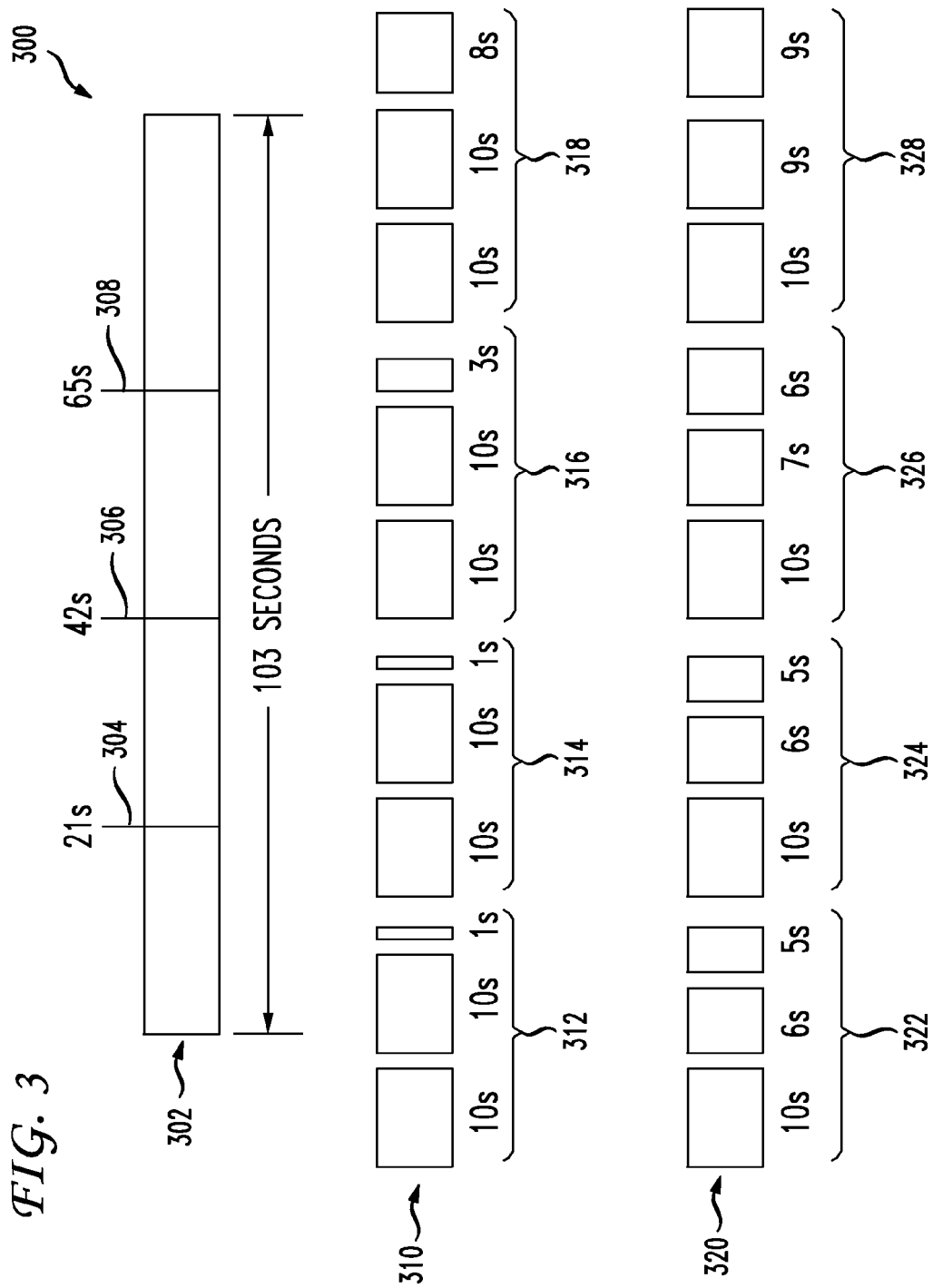
FIG. 3 illustrates splitting a media file into chunks based on chapter breaks.

FIG. 3 illustrates another example of segmenting a 103 second media file 302 having chapter breaks 304, 306, 308 into chunks. The first set of chunks 310 illustrates the existing approach of placing any remaining time in the final chunk. As can be seen, the first two chapters 312, 314 have a final chunk of only 1 second and the third chapter 316 has a final chunk of 3 seconds, each of which can cause video streaming performance problems. Only the last chapter 318 has a final chunk of a reasonable size, 8 seconds, and that is at the end of the media file where the final chunk size does not matter as much.

Using the exemplary algorithm set forth above based on the chapter boundaries, the segmenter can generate a second set of chunks 320. The first chapter 322 is divided into a 10 second chunk, a 6 second chunk, and a 5 second chunk. The second chapter 324 is divided into a 10 second chunk, a 6 second chunk, and a 5 second chunk. The third chapter 326 is divided into a 10 second chunk, a 7 second chunk, and a 6 second chunk. The fourth chapter 328 is divided into one 10 second chunk and two 9 second chunks.

Figure 4:
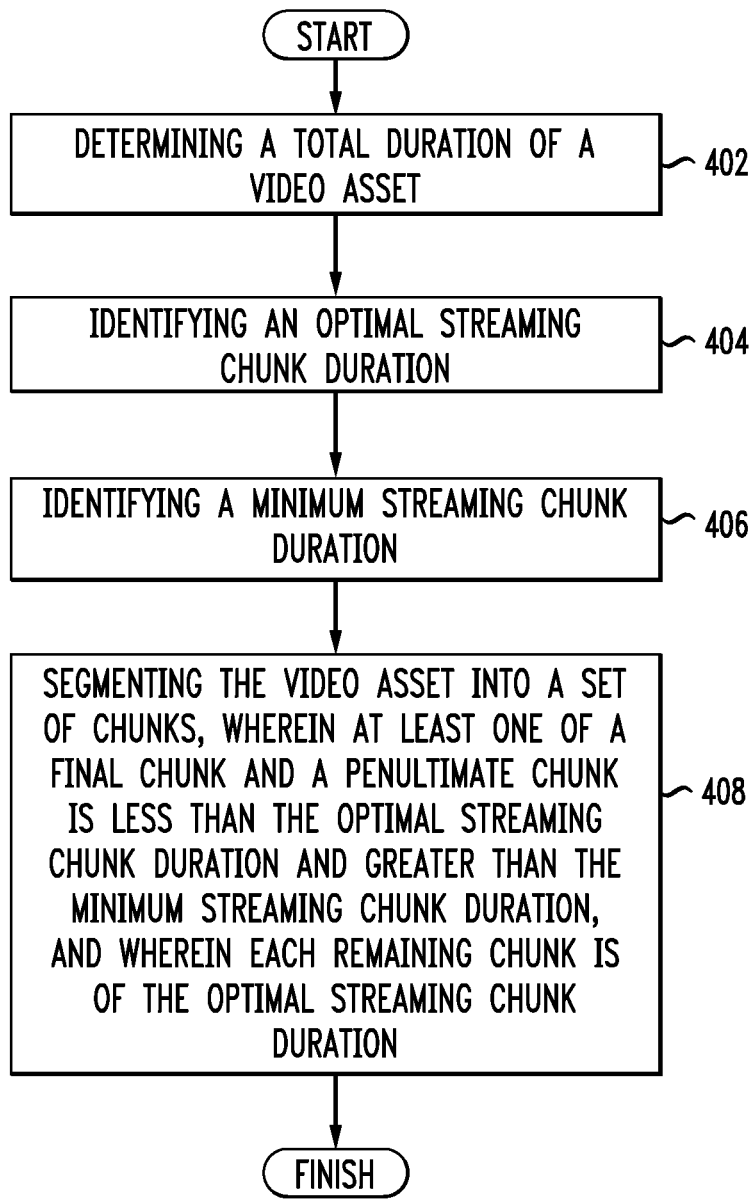
FIG. 4 illustrates an example method embodiment for segmenting a video asset.
Figure 5:
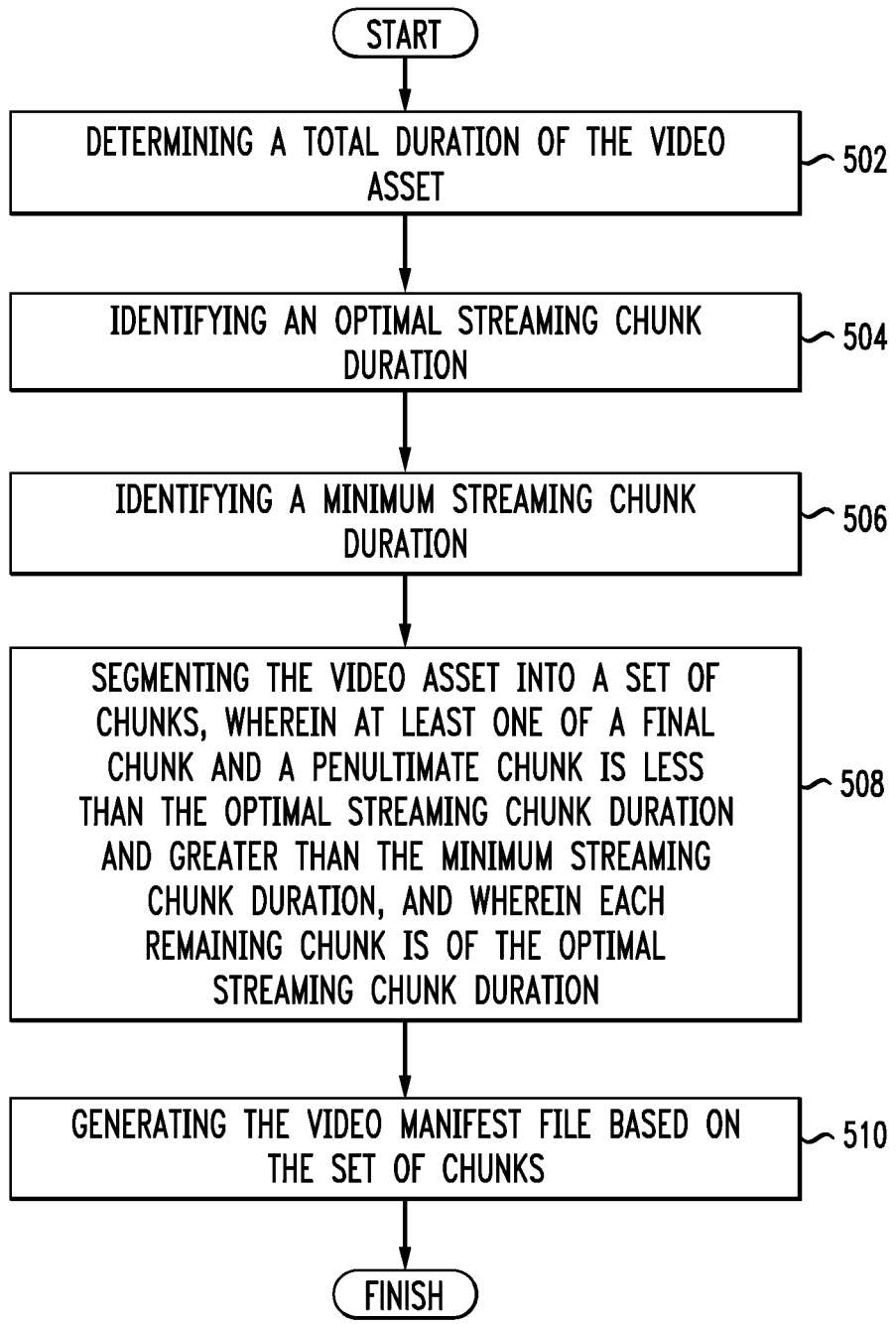
FIG. 5 illustrates an example method embodiment for generating a video manifest file describing a video asset and streaming the video asset.

Having disclosed some basic segmenting concepts for streaming media, the disclosure now turns to the exemplary method embodiments shown in FIGS. 4 and 5. For the sake of clarity, the methods are discussed in terms of an exemplary system 100 as shown in FIG. 1A configured to practice the method. The steps outlined herein are exemplary and can be implemented in any combination thereof, including combinations that exclude, add, or modify certain steps.

FIG. 4 illustrates an example method embodiment for segmenting a video asset. The system 100 determines a total duration of a video asset (402). The system can examine video asset metadata to determine the duration, a function or API call can include an indication of the total duration, and/or the system can analyze all or part of the video asset to determine the duration.

The system 100 identifies an optimal streaming chunk duration (404) and a minimum streaming chunk duration (406). The optimal streaming chunk duration and the minimum streaming chunk duration can have default values if none is specified. In one aspect, the optimal streaming chunk duration is dictated by a standard or guideline duration. As an example, Apple has established a 10 second chunk duration as the optimal streaming chunk duration for the iPad. Other devices, codecs, bandwidth availabilities, and so forth can influence the optimal and/or minimum streaming chunk durations. The durations can be set programmatically, manually, or a combination thereof (such as an automatic suggestion to a user to approve an automatically determined duration or select from a list of automatically determined durations).

The system segments the video asset into a set of chunks, wherein at least one of a final chunk and a penultimate chunk is less than the optimal streaming chunk duration and greater than the minimum streaming chunk duration, and wherein each remaining chunk is of the optimal streaming chunk duration (408). As set forth above, one variation creates the last two chunks (the final and the penultimate chunks) with a shorter duration than the optimal streaming chunk duration, but other variations can create more than two "shorter" chunks and can place the "shorter" chunks non-contiguously anywhere in the set of chunks. The system can segment the video asset into chunks based on keyframes in the video asset, a video asset codec, and/or other factors. The video asset can be a portion of a larger video asset, such as a chapter of a television episode or movie.

FIG. 5 illustrates an example method embodiment for generating a video manifest file describing a video asset and streaming the video asset. The system 100 determines a total duration of a video asset (502). The system 100 identifies an optimal streaming chunk duration (504) and a minimum streaming chunk duration (506). The system 100 segments the video asset into a set of chunks, wherein at least one of a final chunk and a penultimate chunk is less than the optimal streaming chunk duration and greater than the minimum streaming chunk duration, and wherein each remaining chunk is of the optimal streaming chunk duration (508).

The system 100 generates the video manifest file based on the set of chunks (510), such as an m3u8 file or a Media Player Classic Play List (MPCPL) file. The video manifest file can include a set of pointers to each chunk in the set of chunks, such that a video playback device can process the pointers sequentially to fetch and play the video asset chunk by chunk. The system 100 optionally transmits the video manifest file to a playback device and streams the video asset to the video playback device based on the video manifest file. The system 100 can be a central media server storing the media asset, the chunks, and the video manifest file. Alternatively, multiple separate systems can perform different portions of the functionality described herein. In this way, the streaming video in chunks to a playback device avoids the problem of stuttering, especially at video boundaries such as chapters in a video asset.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to any streaming media that is divided into chunks, including audio playback, text, or elements of an interactive environment. Those skilled in the art will readily recognize various modifications and changes that may be made to the principles described herein without following the example embodiments and applications illustrated and described herein, and without departing from the spirit and scope of the disclosure.

We claim:

1. A method of segmenting video, the method comprising:
determining a total duration of a video asset;
identifying a default streaming chunk duration;
identifying a minimum streaming chunk duration; and
segmenting the video asset into a set of chunks, the set of chunks including a final chunk, wherein segmenting comprises: determining a final chunk duration when each other chunk is set to the default streaming chunk duration; and
responsive to the final chunk duration being less than the minimum streaming chunk duration, setting at least the final chunk duration and durations of two or more chunks preceding the final chunk to each be less than the default streaming chunk duration and greater than the minimum streaming chunk duration; and setting remaining chunks in the set of chunks to the default streaming chunk duration.

2. The method of claim 1, further comprising compiling a video manifest file containing pointers to each chunk in the set of chunks.

3. The method of claim 2, wherein the video manifest file is an m3u8 file.

4. The method of claim 1, further comprising streaming the video asset in accordance with a video manifest file to a video playback device.

5. The method of claim 1, wherein the video asset is a portion of a second video asset that is greater in length than the video asset.

6. The method of claim 1, wherein segmenting the video asset into the set of chunks is based on at least one of keyframes in the video asset or a codec of the video asset.

7. A system for streaming a video asset to a video playback device, the system comprising:
a processor;
a first module configured to control the processor to retrieve a video manifest file describing chunks of the video asset, wherein the video manifest file is generated by steps comprising:
determining a total duration of the video asset;
identifying a default streaming chunk duration;
identifying a minimum streaming chunk duration; and
segmenting the video asset into a set of chunks, the set of chunks including a final chunk, wherein segmenting comprises: determining a final chunk duration when each other chunk is set to the default streaming chunk duration; responsive to the final chunk duration being less than the minimum streaming chunk duration, setting at least the final chunk duration and durations of two or more chunks preceding the final chunk to each be less than the default streaming chunk duration and greater than the minimum streaming chunk duration; and setting remaining chunks in the set of chunks to the default streaming chunk duration;
generating the video manifest file based on the set of chunks; and
a second module configured to control the processor to transmit the video manifest file to the video playback device.

8. The system of claim 7, wherein the video manifest file further comprises pointers to each chunk in the set of chunks.

9. The system of claim 7, wherein the video manifest file is an m3u8 file.

10. The system of claim 7, wherein further comprising streaming the video asset to the video playback device chunk by chunk based on a request received from the video playback device.

11. The system of claim 7, wherein the video asset is a portion of a second video asset that is greater in length than the video asset.

12. The system of claim 7, wherein segmenting the video asset into the set of chunks is based on at least one of keyframes in the video asset or a codec of the video asset.

13. A non-transitory computer-readable storage medium storing instructions which, when executed by a computing device, cause the computing device to generate a video manifest file for streaming a video asset, the instructions comprising:
  determining a total duration of the video asset;
  identifying a default streaming chunk duration;
  identifying a minimum streaming chunk duration; and
  segmenting the video asset into a set of chunks, the set of chunks including a final chunk, wherein segmenting comprises: determining a final chunk duration when each other chunk is set to the default streaming chunk duration; and
  responsive to the final chunk duration being less than the minimum streaming chunk duration, setting at least the final chunk duration and durations of two or more chunks preceding the final chunk to each be less than the default streaming chunk duration and greater than the minimum streaming chunk duration; and
  setting remaining chunks in the set of chunks to the default streaming chunk duration.

14. The non-transitory computer-readable storage medium of claim 13, wherein the video manifest file contains a pointer to each chunk in the set of chunks.

15. The non-transitory computer-readable storage medium of claim 13, wherein the video manifest file is an m3u8 file.

16. The non-transitory computer-readable storage medium of claim 13, further comprising streaming the video asset in accordance with the video manifest file to a video playback device.

17. The non-transitory computer-readable storage medium of claim 13, wherein the video asset is a portion of a second video asset that is greater in length than the video asset.

18. The non-transitory computer-readable storage medium of claim 13, wherein segmenting the video asset into the set of chunks is based on at least one of keyframes in the video asset or a codec of the video asset.

\* \* \* \* \*